United States Patent
Gray

(10) Patent No.: US 7,686,990 B2
(45) Date of Patent: Mar. 30, 2010

(54) METHOD OF PRODUCING A CERAMIC MATRIX COMPOSITE ARTICLE

(75) Inventor: Paul Edward Gray, North East, MD (US)

(73) Assignee: General Electric Company, Schenectady, NY (US)

( * ) Notice: Subject to any disclaimer, the term of this patent is extended or adjusted under 35 U.S.C. 154(b) by 1464 days.

(21) Appl. No.: 11/026,275

(22) Filed: Dec. 31, 2004

(65) Prior Publication Data

US 2006/0147622 A1    Jul. 6, 2006

(51) Int. Cl.
*B05D 1/12* (2006.01)
*B05D 3/02* (2006.01)

(52) U.S. Cl. .................. 264/29.1; 427/372.2; 427/430.1

(58) Field of Classification Search .......... 442/178, 442/179; 427/384, 385.5, 387; 501/87; 264/29.1
See application file for complete search history.

(56) References Cited

U.S. PATENT DOCUMENTS

| | | | | |
|---|---|---|---|---|
| 3,936,535 A | * | 2/1976 | Boder | 427/228 |
| 4,626,516 A | * | 12/1986 | Morelock | 501/92 |
| 5,015,540 A | | 5/1991 | Borom et al. | 428/698 |
| 5,330,854 A | | 7/1994 | Singh et al. | 428/698 |
| 5,336,350 A | | 8/1994 | Singh | 156/155 |
| 5,368,934 A | | 11/1994 | Torii et al. | 428/372 |
| 5,628,938 A | | 5/1997 | Sangeeta et al. | 264/28 |
| 5,840,221 A | * | 11/1998 | Lau et al. | 264/29.7 |
| 6,024,898 A | | 2/2000 | Steibel et al. | 264/29.1 |
| 6,258,737 B1 | * | 7/2001 | Steibel et al. | 442/172 |
| 6,280,550 B1 | | 8/2001 | Steibel et al. | 156/182 |
| 7,063,886 B2 | | 6/2006 | Thebault et al. | |
| 2004/0067316 A1 | | 4/2004 | Gray et al. | 427/376.1 |

FOREIGN PATENT DOCUMENTS

GB    2250516    10/1992

* cited by examiner

*Primary Examiner*—Kat Wyrozebski
*Assistant Examiner*—Xue Liu
(74) *Attorney, Agent, or Firm*—William Scott Andes; Gary M. Hartman; Domenica N. S. Hartman

(57) ABSTRACT

A method of producing a CMC article having a net shape, and by which the article can be formed to have an exterior surface with desirable characteristics, such as being free of an imprint pattern of a fiber reinforcement material within the article. The method entails providing a body comprising the fiber reinforcement material, and depositing a coating on a surface of the body. The coating contains a carbonaceous binder and a slurry containing a ceramic particulate material. Following its deposition, the carbonaceous binder within the coating is cured to render the coating machinable, and the coating is then machined to approximately produce the net shape of the article.

19 Claims, 2 Drawing Sheets

METHOD OF PRODUCING A CERAMIC MATRIX COMPOSITE ARTICLE

BACKGROUND OF THE INVENTION

The present invention generally relates to ceramic matrix composite (CMC) materials. More particularly, this invention is directed to methods of forming a CMC article having desired shape, dimensional, and surface characteristics, such as those required to produce a suitable bonding surface.

CMC materials generally comprise a ceramic fiber reinforcement material embedded in a ceramic matrix material. The reinforcement material serves as the load-bearing constituent of the CMC, while the ceramic matrix protects the reinforcement material, maintains the orientation of its fibers, and serves to dissipate loads to the reinforcement material. Of particular interest to high-temperature applications are silicon-based composites, such as silicon carbide (SiC) as the matrix and/or reinforcement material. SiC fibers have been used as a reinforcement material for a variety of ceramic matrix materials, including SiC, TiC, $Si_3N_4$, and $Al_2O_3$. Continuous fiber reinforced ceramic composite (CFCC) materials are a type of CMC that offers light weight, high strength, and high stiffness for a variety of high temperature load-bearing applications. A CFCC material is generally characterized by continuous fibers (filaments) that may be arranged to form a unidirectional array of fibers, or bundled in tows that are arranged to form a unidirectional array of tows, or bundled in tows that are woven to form a two-dimensional fabric or woven or braided to form a three-dimensional fabric. For three-dimensional fabrics, sets of unidirectional tows may, for example, be interwoven transverse to each other.

Various techniques may be employed in the fabrication of CMC components, including chemical vapor infiltration (CVI) and melt infiltration (MI). Each of these fabrication techniques have been used in combination with tooling or dies to produce a near-net-shape article through processes that include the application of heat and chemical processes at various processing stages. In the fabrication of SiC/Si—SiC (fiber/matrix) CFCC materials disclosed in commonly-assigned U.S. Pat. Nos. 5,015,540, 5,330,854, 5,336,350, 5,628,938, and 6,024,898 and commonly-assigned U.S. Patent Application Publication No. 2004/0067316, continuous SiC-containing fibers or tows are coated to impart certain desired surface properties, such as with an interfacial release agent (e.g., boron nitride or carbon) to allow for limited and controlled slip between adjacent fibers, tows, and the surrounding ceramic matrix. In the case of a two-dimensional fabric, the relatively pliable fabric is cut and shaped within appropriate tooling prior to depositing coatings on the fabric. The tooling is then placed in a CVI reactor, where the desired coatings are deposited to yield a porous fiber preform. To increase the rigidity of the preform, the preform may be further coated with a ceramic material. For example, SiC preforms used in the fabrication of SiC/Si—SiC CMS's may be rigidized by depositing a SiC coating on the tows. The rigidized porous fiber preform is then infiltrated to fill the porosity in the preform, such as slurry casting an aqueous suspension of SiC particles followed by melt infiltration with molten silicon. Melt infiltration of the preform is performed to yield a near net-shape CMC article. During melt infiltration, the molten silicon reacts to form a SiC matrix containing some free silicon.

Within the tooling, the rigidity of the preform can be such that the reinforcement fabric is compressed against the tooling surface, with the result that an imprint pattern of the fabric is often visible on the surface of the final CMC article. Such a defect has been observed with preforms rigidized by CVI-deposited SiC coatings. Depending on the intended application of the article, an imprint pattern may be unacceptable, such as where the article is required to have an optical surface, defined herein as a surface that is sufficiently smooth to be suitable for bonding to, for example, a silicon wafer. Attempts have been made to cover the optical surface of a CMC article marred by an imprint pattern by depositing and then firing a layer of a particulate slurry. However, such attempts often do not produce acceptable results because the resulting coating is very fragile and thus difficult to accurately machine for the purpose of establishing the desired shape and dimensions of the CMC article and its optical surface. To address this problem, others have suggested applying a particulate slurry coating on slurry-cast CMC's to form an extension of the particulate used in the slurry casting process. However, the slurry is too soft to permit machining to high tolerances.

In view of the above, it would be desirable if an improved method were available for producing a CMC article with a surface whose shape, dimensions, and surface finish can be carefully controlled.

BRIEF SUMMARY OF THE INVENTION

The present invention provides a method of producing a CMC article having a net shape, and by which the article can be formed to have a surface with desirable characteristics, including being free of an imprint pattern of the reinforcement fabric within the article.

The method of this invention generally entails providing a body comprising a fiber reinforcement material, and depositing a coating on a surface of the body. The coating contains a carbonaceous binder and a slurry containing a ceramic particulate material. Following its deposition, the carbonaceous binder within the coating is cured to render the coating machinable, and the coating is then machined to approximately produce the net shape of the article. Thereafter, the resultant coated, machined body can be melt infiltrated with a molten infiltrant, such as molten silicon, to form a ceramic matrix containing the reinforcement material.

According to a preferred aspect of the invention, the coating is sufficiently robust to withstand commercial CNC machining and inspection by metrology equipment. The robustness and compatibility of the coating can be enhanced by forming the slurry thereof of the same or similar materials used to make the body, including its reinforcement and matrix materials. According to a preferred aspect of the invention, the body is infiltrated with a suitable infiltration material prior to depositing, curing, and machining of the coating, and thereafter melt infiltrated. For the melt infiltration step, the body can be placed in a tool and melt infiltrated while the coating contacts and conforms to a die surface of the tool, during which the melt infiltrant reacts to form the desired ceramic matrix material. During the melt infiltration operation, the coating is also preferably infiltrated with the melt infiltrant, whose conversion to the ceramic matrix material promotes the adhesion of the coating to the underlying CMC substrate of the article. Depending on the melt infiltrant, the carbon constituent within the coating can promote wetting by the melt infiltrant to ensure complete infiltration of the coating, as well as fill any spaces between the surfaces of the coating and die to more fully and reliably obtain the desired net shape of the article.

In view of the above, it can be seen that a significant advantage of this invention is that, because the coating provides a barrier between the reinforcement material of the body and the surface of the die, imprint patterns and other potential surface flaws resulting from the reinforcement material and processing of the body are avoided. In so doing, the coating is largely responsible for producing the final shape, dimensions, and surface of the CMC article. Because machining of the coating is performed in the green state, the coating can be more readily machined to a very near net-shape than would be possible if attempting to machine the much harder material of the final CMC substrate.

Other objects and advantages of this invention will be better appreciated from the following detailed description.

DETAILED DESCRIPTION OF THE INVENTION

Figure 1:
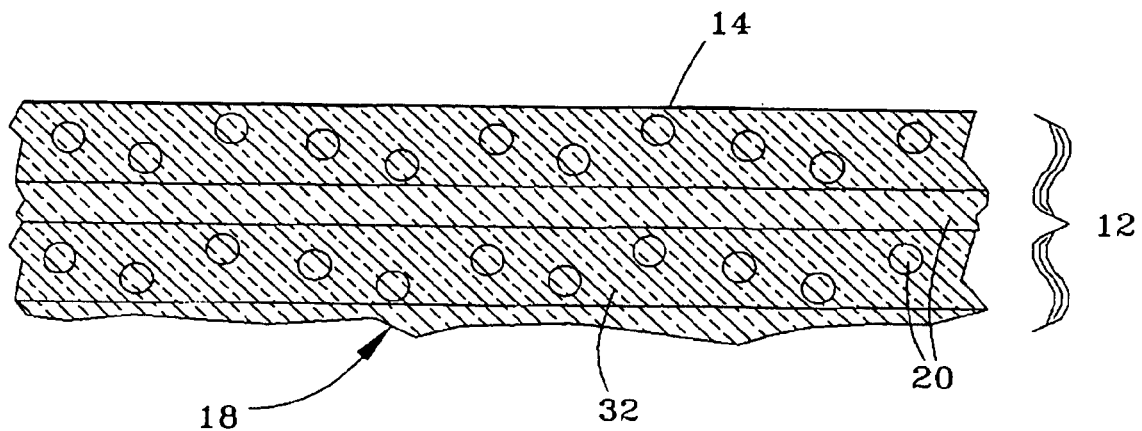
FIG. 1 is a fragmentary cross-sectional view of a slurry cast preform of a type for producing a CMC article in accordance with an embodiment of the present invention.

FIGS. 1 through 4 represent cross-sectional views of a surface portion of a body undergoing processing steps to produce a CMC article 10 (FIG. 4) in accordance with a preferred embodiment of the invention. As a CMC, the article 10 comprises a ceramic matrix 22 reinforced with a ceramic reinforcement fabric 18 made up of individual continuous tows 20 (bundles of continuous fibers). In a preferred embodiment, the reinforcement material 20 and the matrix 22 are formed of or at least comprise silicon carbide (SiC). Also in the preferred embodiment, the matrix 22 is formed by a silicon MI process, such that the matrix 22 further contains some free silicon. As such, the article 10 may be referred to as a SiC/Si—SiC (fiber/matrix) CMC, in accordance with the teachings of commonly-assigned U.S. Pat. Nos. 5,015,540, 5,330,854, 5,336,350, 5,628,938, and 6,024,898 and commonly-assigned U.S. Patent Application Publication No. 2004/0067316, whose disclosures relating to compositions and processing of SiC/Si—SiC CMC's are incorporated herein by reference. Those skilled in the art will appreciate that the teachings of this invention are also applicable to other CMC material combinations, and that such combinations are within the scope of this invention.

FIG. 1 represents a cross-sectional view of a CMC preform 12 made up of the reinforcement fabric 18 of the final CMC article 10. The preform 12 is depicted in FIG. 1 as it would appear following cutting, sizing, and shaping of the fabric 18 in a mold according to conventional practice, followed by slurry casting the fabric 18 by infiltration with a suspension containing a ceramic particulate material, preferably SiC particles, to yield a ceramic-containing matrix 32 surrounding the fabric 18. The matrix 32 is porous, containing small pores or voids (not shown) that are not closed but are instead open to the surface 14 of the preform 12. As depicted in FIG. 1, the preferred fabric 18 has a two-dimensional construction formed by cross-weaving transverse sets of uniaxially-aligned tows 20. As such, the preform 12 is configured to produce an article that would be referred to as a continuous fiber reinforced ceramic composite (CFCC). As previously noted, the preferred material for the tow fibers is SiC, a notable commercial example of which is HI-NICALON® from Nippon Carbon Co., Ltd. A suitable range for the diameter of the tows 20 is about two to about twenty micrometers, though fibers with larger and smaller diameters are also within the scope of this invention.

Prior to slurry casting the preform 12, the tows 20 are preferably coated with materials to impart certain desired properties to the preform 12 and its reinforcement fabric 18. For example, in the preferred embodiment the tows 20 have a carbon or boron nitride interface layer over which a SiC coating is deposited (not shown) to increase the rigidity of the preform 12 and protect the tows 20 during melt infiltration. According to known practices, the interface layer and SiC coating can be deposited by CVI, though other deposition techniques are also possible.

Figure 2:
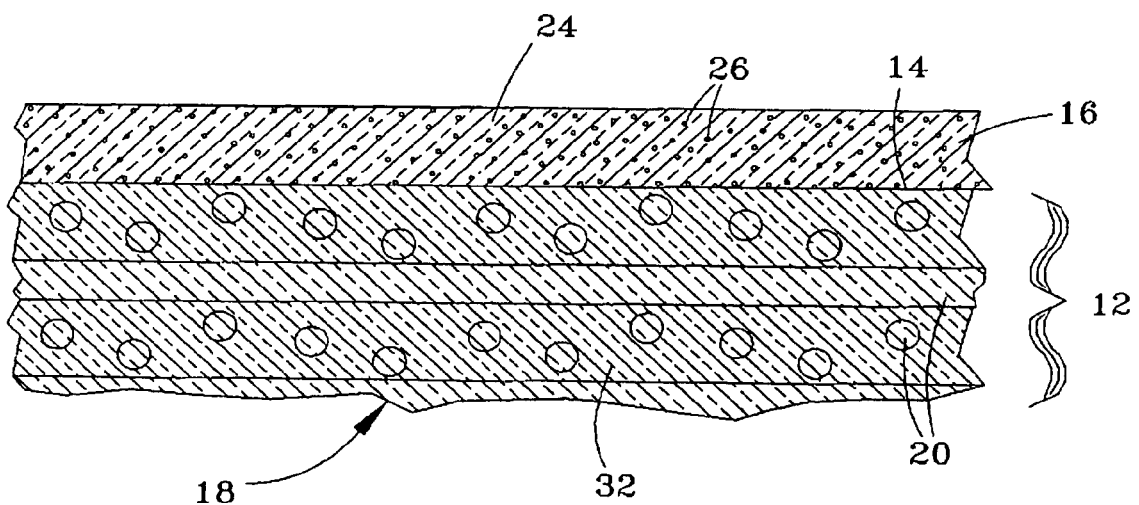
FIG. 2 is a fragmentary cross-sectional view of the preform of FIG. 1 on whose surface a coating has been deposited in accordance with the present invention.

FIG. 2 represents a cross-sectional view of the CMC preform 12 following deposition of a resin matrix coating 16 on its surface 14. The resin matrix coating 16 contains a carbonaceous binder 24 that can be cured so that the coating 16 has green properties that permit machining of the coating 16, as well as handling of the preform 12 and its coating 16. As such, the exterior surface of the preform 12 as defined by the coating 16 can be machined so that the exterior of the preform 12 is very near the desired net shape of the article 10. Preferred carbonaceous binders 24 for the coating 16 are furanic resins, such as furfuryl alcohol resins, such as furfuryl alcohol ($C_4H_3OCH_2OH$) with or without modifiers such as a phenolic resin (e.g., phenol formaldehyde). Dispersed in the binder 24 is a particulate filler 26, preferably a material that will be present in the ceramic matrix 22 of the article 10, e.g., silicon and/or SiC particulate in the case of the preferred Si—SiC matrix 22. A suitable particle size range for the filler 26 is about 0.05 to about 40 micrometers, and a suitable loading for the filler 26 in the coating 16 is about five to about sixty-five volume percent of the coating 16. The coating 16 can be deposited by spraying or casting a slurry containing the binder 24 and particulate filler 26 onto the surface 14 of the preform 12, with a suitable thickness being in a range of about 0.1 to about 5 mm. Curing of the preferred carbonaceous binder materials typically requires a temperature in the range of about 100 to about 200° C. for a duration of about five to about two hundred minutes, during which time volatiles evolve to form porosity within the coating 16. The combination of high solids content of the slurry with the high char yield of the preferred carbon-containing furanic resins produces a durable coating 16 that exhibits little shrinkage during curing.

As evident from FIG. 2, the cured coating 16 prevents tows 20 of the reinforcement fabric 18 from being exposed at the surface of the preform 12 as defined by the coating 16. As such, imprint patterns and other potential surface flaws that would result from the reinforcement fabric 18 and processing of the preform 12 are avoided. In so doing, the coating 16 is responsible for producing the exterior shape, dimensions, and surface of the preform 12. Once cured, the resin matrix coating 16 is sufficiently rigid to resist deformation yet is much easier to machine than would be the ceramic matrix 22 of the article 10. Notably, this aspect of the invention permits the coating 16 to be machined with CNC equipment to very nearly obtain the shape, dimensional, and surface characteristics desired for the article 10 produced from the preform 12. For example, the coating 16 can be machined to achieve dimensional tolerances of ±20 micrometers and less. A suitable minimum thickness for the machined coating 16 is about 125 micrometers to ensure that the reinforcement fabric 18 remains concealed during subsequently handling and processing of the preform 12.

Figure 3:
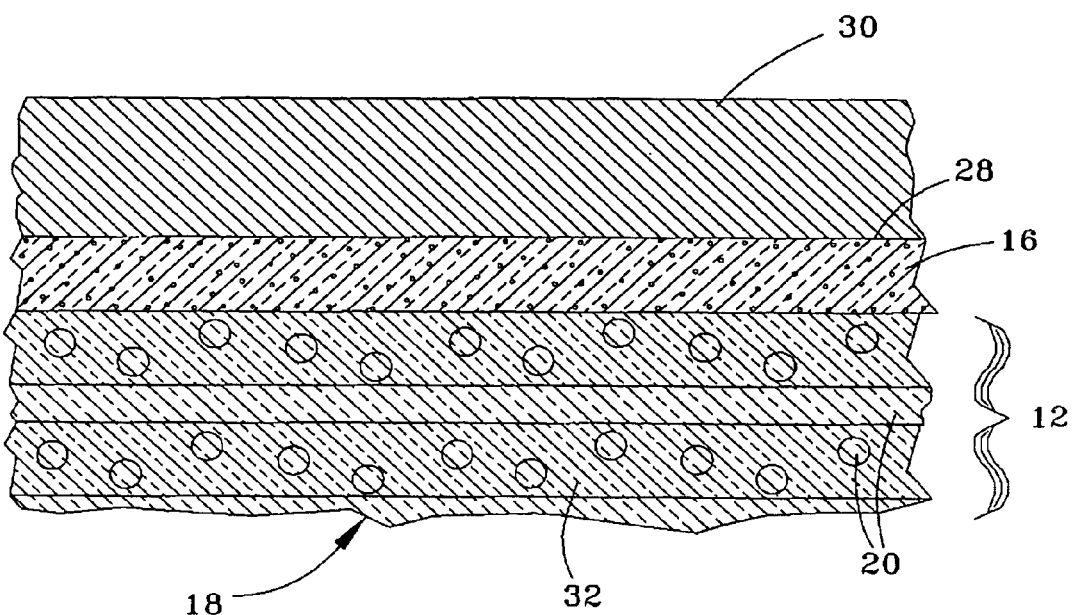
FIG. 3 is a fragmentary cross-sectional view of the preform of FIG. 2 following machining of the coating and placing the preform within a tool.

Once the desired dimensional and surface characteristics are obtained with the machined coating 16, the resulting near net-shape preform 12 is ready for melt infiltration to produce the article 10. FIG. 3 represents a cross-sectional view of the preform 12 after machining of the coating 16 and placement of the preform 12 in a tool 30, but prior to melt infiltration of the preform 12. The tool 30 can be a component of any suitable apparatus for producing CMC articles, such as an autoclave. As evident from FIG. 3, the machined coating 16 lies between the preform 12 and a die surface of the tool 30, such that tows 20 at the surface 14 of the preform 12 do not contact the tool 30. Again, this aspect of the invention prevents the reinforcement fabric 18 from creating surface flaws in the final CMC article 10. The machined surface 28 of the coating 16 directly contacts the tool 30, or optionally a coating (not shown) on the die surface that inhibits adhesion of the coating 16 to the tool 30, the latter of which may be, or example, formed of graphite. A suitable coating material for this purpose is boron nitride (BN) or possibly silicon nitride ($Si_3N_4$). The machined surface 28 of the coating 16 is preferably precision machined to have a matched-surface with the die surface of the tool 30. Because of its resinous composition, the coating 16 can also be pressed against the die surface, causing the coating surface 28 to conform to the die surface so that only small gaps potentially exist between the coating surface 28 and the tool 30.

Figure 4:
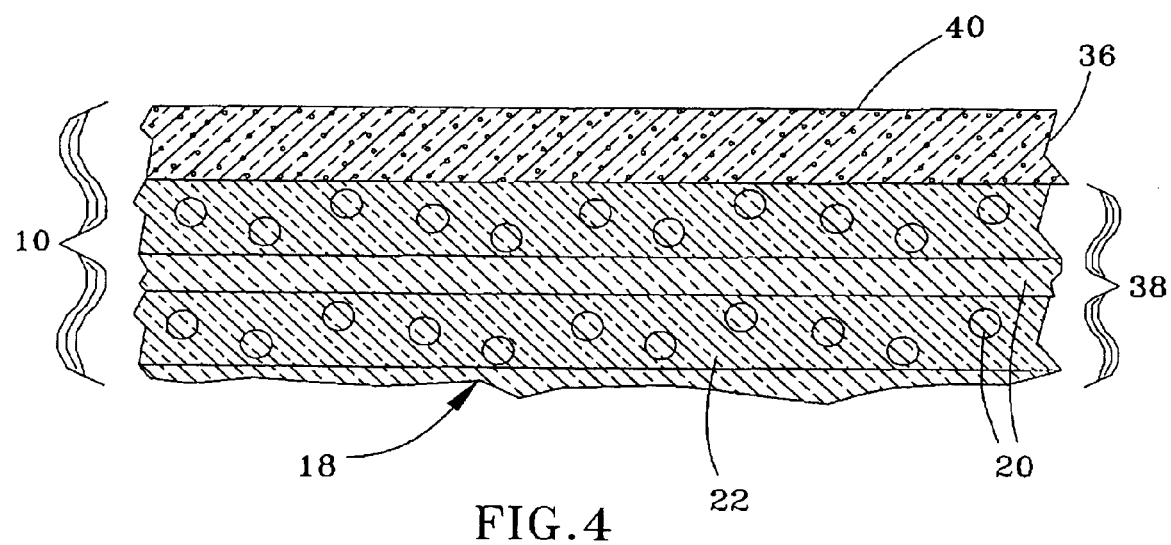
FIG. 4 is a fragmentary cross-sectional view of a CMC article formed by melt infiltrating the coated preform of FIG. 3.

While within the tool 30, the preform 12 is melt infiltrated to form a CMC substrate 38 (FIG. 4) comprising the reinforcement fabric 18 within the desired ceramic matrix 22, after which the resulting CMC article 10 is removed from the tool 30 as depicted in FIG. 4. To yield the preferred Si—SiC matrix 22, the preform 12 is preferably melt infiltrated with molten silicon, which reacts in situ with the carbon-containing matrix 32 to form silicon carbide. As a result of the melt infiltration operation, the resin matrix coating 16 has been converted to a hard ceramic outer coating 36. Due to the porosity of the cured coating 16, molten silicon also infiltrates the coating 16 during melt infiltration, reacting with carbon remaining within the cured coating 16 to form SiC, further densify the coating 16, and promote the bond between the final ceramic coating 36 and SiC/Si—SiC substrate 38. Carbon within the cured coating 16 also promotes wetting by molten silicon to ensure complete infiltration of the coating 16. Adhesion of the coating 36 to the SiC/Si—SiC substrate 38 is further promoted as a result of the coating 36 containing a high percentage of particulate filler 26 of the same material as the ceramic matrix 22, and the consequent similar thermal expansions of the coating 36 and SiC/Si—SiC substrate 38.

Because the machined surface 28 of the cured coating 16 was pressed against the die surface of the tool 30 during melt infiltration, the amount of final machining required to obtain the desired net shape exterior surface 40 of the article 10 is minimal. Gaps between the coating 16 and tool 30 can be filled during melt infiltration by the molten silicon, such that the final exterior surface 40 of the article 10 is a dense ceramic whose shape, dimensions, and surface characteristics are determined by the tool 30.

In an investigation leading up to the invention, a roughly 24×24 cm square panel of reinforcement material was fabricated with tow formed of HI-NICALON® fibers. The panel was preformed into graphite tooling, run through a pyrolytic carbon CVI cycle to deposit a layer of carbon on the fibers, demolded from the tooling, and then run through a CVI SiC cycle to deposit a layer of SiC for the purpose of rigidizing the preform. The preform was then slurry cast using a slurry containing SiC particulate suspended in water. The finished panel was then spray coated with a mixture of furanic resin, carbon black, and SiC powder. The resulting coating had a thickness of about 300 to 400 micrometers, which was sufficiently thick to mask fibers protruding or otherwise present at the surface of the preform. The coating was then covered with a TEFLON®-coated glass fabric and pressed in a heated platen press at a temperature of about 165° C. for about thirty minutes to cure the resin. After curing, during which the coating polymerized and bonded to the panel surface, the coating was machined using a wet diamond orbital sander. Material removal rates were such that approximately 2 to 4 mils (about 50 to 100 micrometers) of surface was removed from the panel in less than ten minutes.

The resulting surface condition of the coating evidenced that the shape, dimensions, and surface finish of the coating could be controlled to the extent that a net shape surface having desirable surface properties could be fabricated according to the evaluated process with only minimal machining required after melt infiltration. As such, the investigation evidenced that the capability of the process to produce a smooth silicon carbide surface layer, for example, sufficiently smooth for bonding to a silicon or SiC wafer.

The investigation also evidenced the capability of applying and curing a resin matrix coating before melt infiltration of the preform. This approach advantageously allowed for simultaneous melt infiltration of the coating by the melt infiltrant, thereby promoting bonding of the coating to the final CMC substrate.

While the invention has been described in terms of a preferred embodiment, it is apparent that other forms could be adopted by one skilled in the art. Therefore, the scope of the invention is to be limited only by the following claims.

What is claimed is:

1. A method of producing a ceramic matrix composite article having an exterior surface with a net shape, the method comprising the steps of:

providing a body comprising a fiber reinforcement material, a matrix material surrounding the fiber reinforcement material, an external surface defined by the matrix material, and internal porosity within the body and open to the external surface;

depositing on the external surface of the body a coating comprising a carbonaceous binder and a slurry containing a ceramic particulate material, the coating covering the external surface of the body and defining an external coating surface on the body at which the fiber reinforcement material is not exposed;

curing the carbonaceous binder to render the coating machinable;

machining the coating to remove only surface portions of the coating and yield an external machined coating surface that approximately produces the net shape of the article, the coating being sufficiently thick such that machining of the coating does not expose the fiber reinforcement material within the body;

melt infiltrating the body with a melt infiltration material while the coating contacts and conforms to a die surface; and then reacting the melt infiltration material to form a ceramic matrix within a composite substrate containing the fiber reinforcement material, the coating forms a ceramic coating bonded to the composite substrate to form the article, and the ceramic coating defines the external surface substantially having the net shape.

2. The method according to claim 1, wherein the carbonaceous binder is at least one furanic resin.

3. The method according to claim 1, wherein the carbonaceous binder comprises furfuryl alcohol.

4. The method according to claim 1, wherein the carbonaceous binder contains phenol formaldehyde.

5. The method according to claim 1, wherein the ceramic particulate material of the coating comprises silicon carbide particulate.

6. The method according to claim 1, wherein the fiber reinforcement material and the ceramic particulate material of the coating contain silicon carbide.

7. The method according to claim 1, wherein the body further comprises a coating on the fiber reinforcement material.

8. The method according to claim 7, wherein the coating on the fiber reinforcement material comprises a ceramic material.

9. The method according to claim 8, wherein the ceramic material of the coating on the fiber reinforcement material and the ceramic particulate material of the coating deposited on the surface of the body have the same chemical composition.

10. The method according to claim 9, wherein the ceramic material of the coating on the fiber reinforcement material and the ceramic particulate material of the coating deposited on the surface of the body contain silicon carbide.

11. The method according to claim 1, wherein the melt infiltration material comprises molten silicon and the reacting step reacts at least a portion of the molten silicon to silicon carbide as the ceramic matrix.

12. The method according to claim 11, wherein the melt infiltrating step further comprises melt infiltrating the coating with the molten silicon, and the molten silicon that melt infiltrates the coating is reacted to form silicon carbide during the reacting step.

13. The method according to claim 1, the method further comprising the steps of:
    prior to depositing the coating on the surface of the body, infiltrating the body with a suspension containing a carbon-containing infiltrant; and
    after machining the coating, melt infiltrating the body to react the carbon-containing infiltrant and form a ceramic matrix within a composite substrate containing the fiber reinforcement material, the coating forming a ceramic coating bonded to the composite substrate to form the article, and the ceramic coating defining the external surface substantially having the net shape.

14. The method according to claim 13, wherein the suspension is a slurry containing particulate silicon carbide and the ceramic matrix formed therefrom comprises silicon carbide.

15. The method according to claim 1, wherein the fiber reinforcement material is a continuous fiber material comprising at least two transverse sets of uniaxially-aligned tows.

16. A method of producing a ceramic matrix composite article having an exterior surface with a net shape, the method comprising the steps of:
    providing a preform comprising a silicon carbide-containing continuous fiber reinforcement material, a matrix material surrounding the fiber reinforcement material, an external surface defined by the matrix material, and internal porosity within the preform and open to the external surface;
    depositing on the external surface of the preform a coating comprising a furanic resin binder and a slurry containing particulate silicon carbide, the coating covering the external surface of the preform and defining an external coating surface on the preform at which the fiber reinforcement material is not exposed;
    curing the furanic resin binder to render the coating machinable;
    machining the coating to remove only surface portions of the coating and yield an external machined coating surface that approximately produces the net shape of the article, the coating being sufficiently thick such that machining of the coating does not expose the fiber reinforcement material within the preform;
    placing the preform in a tool and melt infiltrating the preform with molten silicon while the coating contacts and conforms to a surface of the tool; and
    reacting the molten silicon to form a silicon carbide-containing matrix within a composite substrate containing the fiber reinforcement material, the coating forming a ceramic coating bonded to the composite substrate to form the article, and the ceramic coating defining the external surface substantially having the net shape.

17. The method according to claim 16, wherein the furanic resin binder comprises furfuryl alcohol.

18. The method according to claim 16, further comprising the step of providing the preform with a carbon-containing material that is reacted during the reacting step to participate in formation of the silicon carbide-containing matrix.

19. The method according to claim 16, wherein the melt infiltrating step further comprises melt infiltrating the coating with the molten silicon, and the molten silicon that melt infiltrates the coating is reacted to form silicon carbide during the reacting step.

* * * * *